US010803230B2

(12) United States Patent
Lhasnaoui

(10) Patent No.: US 10,803,230 B2
(45) Date of Patent: Oct. 13, 2020

(54) DEVICE FOR AUTHENTICATING COMMUNICATION VIA MESSAGE FORMAT ENCODING AND DECODING

(71) Applicant: BULL SAS, Les Clayes-sous-Bois (FR)

(72) Inventor: Khalid Lhasnaoui, Magny-les-Hameaux (FR)

(73) Assignee: BULL SAS, Les Clayes-sous-Bois ( * ) Notice: Subject to any disclaimer, the term of this patent is extended or adjusted under 35 U.S.C. 154(b) by 0 days.

(21) Appl. No.: 15/354,419

(22) Filed: Nov. 17, 2016

(65) Prior Publication Data
US 2017/0139876 A1 May 18, 2017

(30) Foreign Application Priority Data
Nov. 18, 2015 (FR) ..................................... 15 02419

(51) Int. Cl.
G06F 40/106 (2020.01)
G06F 40/30 (2020.01)
G06F 21/00 (2013.01)
H03M 13/00 (2006.01)
H03M 7/30 (2006.01)
G09G 5/00 (2006.01)

(52) U.S. Cl.
CPC ............ *G06F 40/106* (2020.01); *G06F 21/00* (2013.01); *G06F 40/30* (2020.01); *G09G 5/005* (2013.01); *G09G 5/006* (2013.01); *H03M 7/3082* (2013.01); *H03M 7/70* (2013.01); *H03M 13/00* (2013.01); *G09G 2358/00* (2013.01)

(58) Field of Classification Search
CPC ....................... H03M 13/2948; G06F 11/1625
See application file for complete search history.

(56) References Cited

U.S. PATENT DOCUMENTS 6,044,468 A * 3/2000 Osmond ............. H04L 41/0213
380/281
9,191,344 B2 * 11/2015 Carter ..................... H04L 51/32
9,209,937 B2 * 12/2015 Andersson ........ H03M 13/3738
2003/0159053 A1 * 8/2003 Fauble .................... G06F 21/83
713/189

(Continued)

OTHER PUBLICATIONS

Search Report and Written Opinion as issued in French Patent Application No. 1502419, dated Aug. 4, 2016.

(Continued)

*Primary Examiner* — Ariel Mercado
(74) *Attorney, Agent, or Firm* — Pillsbury Winthrop Shaw Pittman LLP

(57) ABSTRACT

The present teaching relates to a communication authentication device that includes a data storage system, a first communication interface, a display screen, and a processor. The processor is connected to the data storage system, first communication interface, and display screen. The processor may be configured to: acquire a first message in a binary format via the first communication interface; decode the first message in the binary format in accordance with a message formatting standard (e.g., the H standard, which requires particular sizes of messages), to obtain a first decoded message in a text format; and transmit the first decoded message in the text format to the display screen for comparison purposes.

8 Claims, 3 Drawing Sheets

(56) References Cited

U.S. PATENT DOCUMENTS

| | | | |
|---|---|---|---|
| 2006/0034456 A1* | 2/2006 | McGough | H04L 9/0844 380/30 |
| 2007/0079379 A1* | 4/2007 | Sprosts | G06Q 10/107 726/24 |
| 2009/0176518 A1* | 7/2009 | Doni | H04W 4/12 709/206 |
| 2009/0271616 A1* | 10/2009 | Hofstadter | H04L 63/0464 713/153 |
| 2011/0225307 A1* | 9/2011 | George | H04L 69/10 709/227 |
| 2012/0036278 A1* | 2/2012 | Rafsky | G06F 17/30581 709/232 |
| 2013/0120168 A1* | 5/2013 | Kumar | H03M 7/3059 341/90 |
| 2014/0304505 A1* | 10/2014 | Dawson | G06F 21/6227 713/165 |
| 2016/0099814 A1* | 4/2016 | Negi | H04L 9/3268 713/171 |
| 2016/0269174 A1* | 9/2016 | Yasuda | H04L 9/008 |
| 2017/0033925 A1* | 2/2017 | DeNeut | H04L 9/0869 |
| 2018/0069706 A1* | 3/2018 | Dubrova | G06F 11/1004 |

OTHER PUBLICATIONS

Anonymous, "Lattice Problem," Wikipedia, Oct. 2015, Retrieved from the Internet: URL: https://en.wikipedia.org/w/index.php?title=Lattice_problem&oldid=687560359 [retrieved on Aug. 2, 2016], 6 pages.

Anonymous, "Digital watermarking," Wikipedia, Nov. 2015, Retrieved from the Internet: URL: https://en.wikipedia.org/w/index.php?title=Digital_watermarking&oldid=689606783 [retrieved on Aug. 2, 2016], 8 pages.

* cited by examiner

DEVICE FOR AUTHENTICATING COMMUNICATION VIA MESSAGE FORMAT ENCODING AND DECODING

CROSS-REFERENCE TO RELATED APPLICATIONS

This application claims priority to French Patents Application No. 1502419, filed Nov. 18, 2015, the entire content of which is incorporated herein by reference in its entirety.

TECHNICAL FIELD OF THE INVENTION

The technical field of the invention is that of information and communication systems used within the scope of military interventions. The present invention relates to a communication authentication device.

TECHNOLOGICAL BACKGROUND OF THE INVENTION

Information and communication systems used within the scope of military interventions must typically be capable of using a message formatting standard, known as "H standard". A messaging application is associated with the H standard: it is conventionally designated as H messaging on devices used by the forces deployed. H messaging enables communication by exchanges of binary messages, of reduced size of the order of several bits. The size of an H message is variable. The size of an H message may thus be:

6 octets for a short message of 48 bits,
12 octets for a long message of 96 bits,
more than 12 octets for other types of messages.

A first information and communication system in the sense of the present document is for example the so-called SICS (Scorpion combat information system). A second information and communication system in the sense of the present document is for example the so-called SIT ALAT (French army light aviation terminal information system). The SICS system and SIT ALAT system implement, a priori, the H standard.

It is notably desirable to be able to check the conformity of such an information and communication system with the H standard. It is also desirable to be able to authenticate a communication of such an information and communication system.

DESCRIPTION OF THE INVENTION

The invention offers a solution to the aforementioned problems, by proposing a communication authentication device that makes it possible to authenticate or, conversely, to invalidate a communication of an information and communication system such as the SICS system or the SIT ALAT system.

An aspect of the invention thus relates to a communication authentication device comprising:
a data storage system;
a first communication interface;
a display screen;
a processor connected to the data storage system, to the first communication interface and to the display screen, the processor being configured to:
acquire a first message in a binary format via the first communication interface;
decode the first message in the binary format in accordance with a so-called "H standard", to obtain a first decoded message in a text format;
transmit the first decoded message in the text format to the display screen.

In the present document, "message in a binary format" is taken to mean a message of which the interpretation by a human being requires beforehand processing carried out by a machine other than a text editor. A message in a binary format cannot, as such, be interpreted—that is to say be read and understood—by a human being. The unit of interpretation of a message in a binary format is in general the bit. A binary format may notably be:

a binary stream in which the bits are read one by one,
a hexadecimal stream in which the bits are read four by four,
an octet stream in which the bits are read eight by eight, etc.

The above list is not limiting.

A binary format is for example a format of which the extensions are:
the extension .zip,
the extension .pdf,
the extension .doc, etc.

In the present document, "message in a text format" is taken to mean a message of which the interpretation by a human being is directly possible by means of a simple text editor, of "Bloc-notes" or "Notepad" type. A message in a text format does not require any prior processing by a machine other than a text editor. The unit of interpretation of a message in a text format is the octet. A text format is for example:
the format .txt,
the format .xml,
the format json, etc.

Thanks to the invention, a first message in a binary format, which it is wished to authenticate, is acquired by the processor by means of the first communication interface. The first message in the binary format is not intelligible directly by a human being. The processor then carries out a decoding of said first message in the binary format. In order to decode said first message in the binary format, the processor uses the message formatting standard known as the "H standard". The result of the decoding carried out by the processor is a first decoded message in a text format. The first decoded message in the text format is then transmitted by the processor to the display screen. The first decoded message in the text format is directly intelligible by a human being. The information contained in the first message in the binary format may thus be verified and authenticated by a human being, by means of the display screen. A human user may then for example make a comparison of the information contained in the first message with a reference information.

Apart from the characteristics that have been mentioned in the preceding paragraph, the communication authentication device according to the invention may have one or more of the additional characteristics among the following, considered individually or according to any technically possible combinations thereof:

The communication authentication device comprises a second input interface, the processor being connected to the second input interface and the processor being configured to acquire a second message in the text format via the second input interface.
The processor is configured to:
compare the second message in the text format with the first interpreted message in the text format;

transmit a result of the comparison to the display screen.

The processor then advantageously makes it possible to make a more rapid, efficient and reliable comparison than a comparison made by a human user.

The processor is configured to:
- encode the second message in the text format according to the binary format to obtain a second message in the binary format;
- compare the first message in the binary format with the second message in the binary format;
- transmit a result of the comparison to the display screen.

BRIEF DESCRIPTION OF THE FIGURES

The figures are presented for indicative purposes and in no way limit the invention.

FIG. 1b shows a diagram of the steps of operating the communication authentication device of FIG. 1a.

FIG. 2b shows a diagram of the steps of a first mode of operating the communication authentication device of FIG. 2a.

FIG. 2c shows a diagram of the steps of a second mode of operating the communication authentication device of FIG. 2a.

FIG. 2d shows a diagram of the steps of a third mode of operating the communication authentication device of FIG. 2a.

DETAILED DESCRIPTION OF AT LEAST ONE EMBODIMENT OF THE INVENTION

Unless stated otherwise, a same element appearing in the different figures has a single reference.

In the present document, as well as explained previously:
- "message in a binary format" is taken to mean a message of which the interpretation by a human being requires beforehand processing carried out by a machine other than a text editor, and
- "message in a text format" is taken to mean a message of which the interpretation by a human being is directly possible by means of a simple text editor, of "Bloc-notes" or "Notepad" type.

Figure 1A:
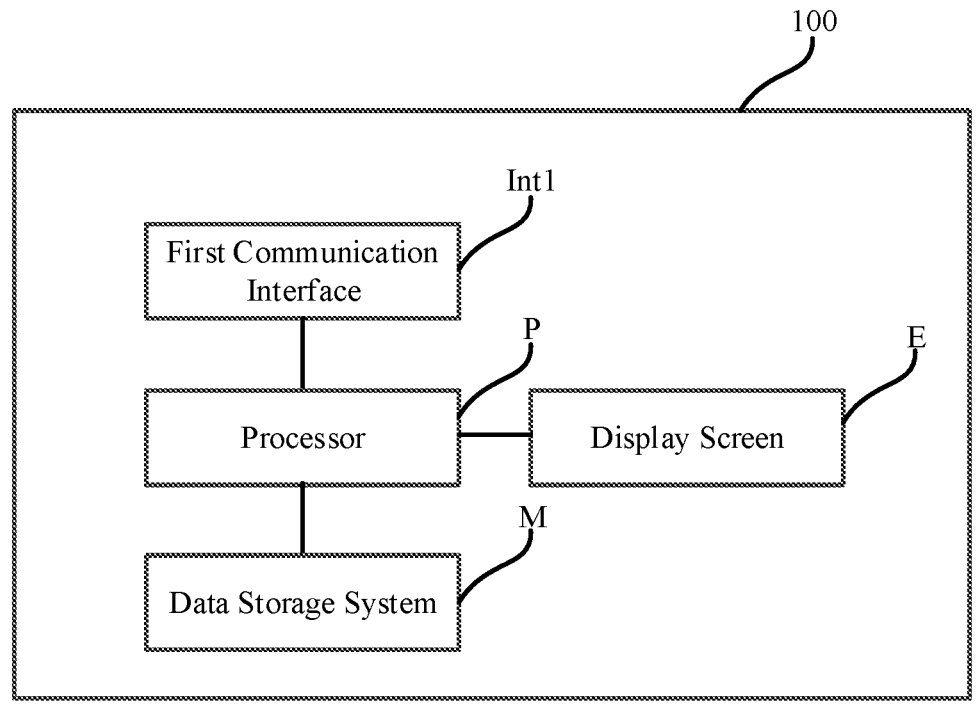
FIG. 1a schematically shows a communication authentication device according to a first embodiment of the invention.
Figure 1B:
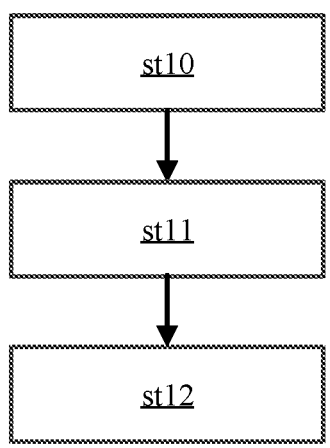

FIG. 1a schematically shows a communication authentication device 100 according to a first embodiment of the invention. FIG. 1b shows a diagram of the steps of operating the communication authentication device 100 according to the first embodiment of the invention. FIGS. 1a and 1b are described jointly.

The communication authentication device 100 according to the first embodiment of the invention comprises:
- a data storage system M;
- a first communication interface Int1;
- a display screen E;
- a processor P connected to the data storage system M, to the first communication interface Int1 and to the display screen E.

The first communication interface Int1 is capable of receiving messages on the one hand, and of transmitting messages on the other hand. The first communication interface Int1 can, according to a first alternative, receive messages thanks to an input by a user. The first communication interface Int1 can, according to a second alternative, receive messages thanks to a network, such an Ethernet network. The first communication interface Int1 can, according to a third alternative, receive messages thanks to a reader in a file.

The processor P of the communication authentication device 100 according to the first embodiment of the invention is configured to:
- according to step st10, acquire a first message in a binary format via the first communication interface Int1;
- according to step st11, decode the first message in the binary format in accordance with a so-called "H standard", to obtain a first decoded message in a text format;
- according to step st12, transmit the first decoded message in the text format to the display screen.

Figure 2A:
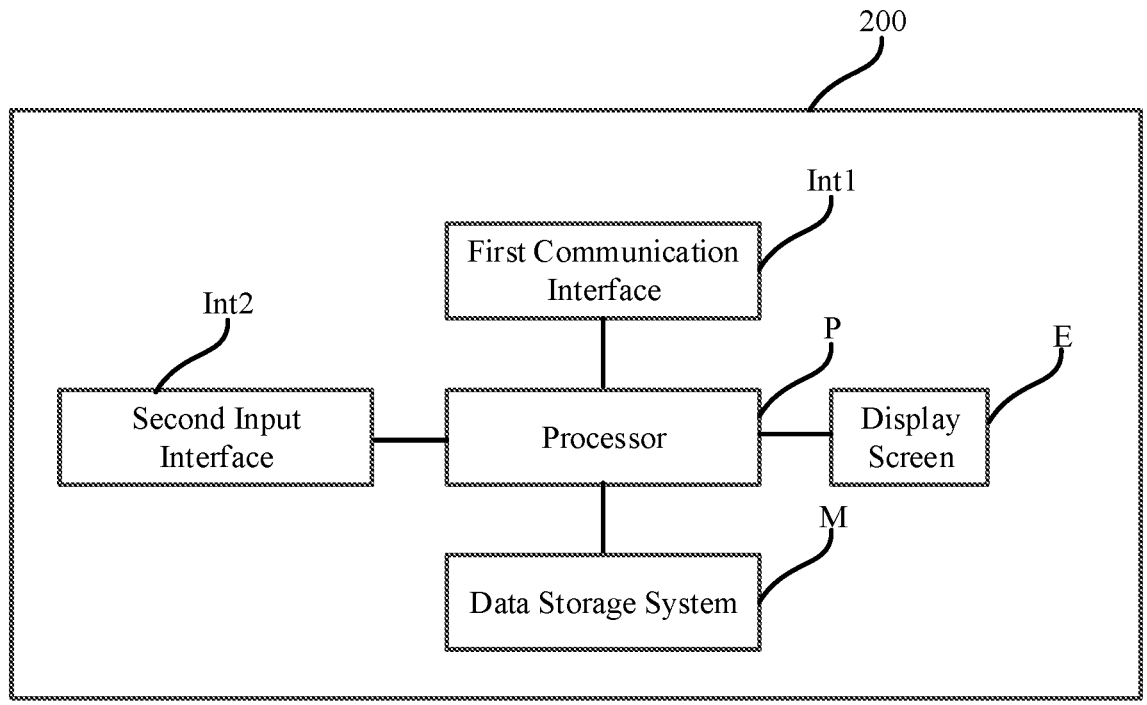
FIG. 2a schematically shows a communication authentication device according to a second embodiment of the invention.

FIG. 2a schematically shows a communication authentication device 200 according to a second embodiment of the invention. The communication authentication device 200 according to the second embodiment of the invention comprises:
- the data storage system M;
- the first communication interface Int1;
- a second input interface Int2;
- the display screen E;
- the processor P.

According to the second embodiment of the invention, the processor P is connected to the data storage system M, to the first communication interface Int1, to the display screen E and to the second input interface Int2.

Figure 2B:
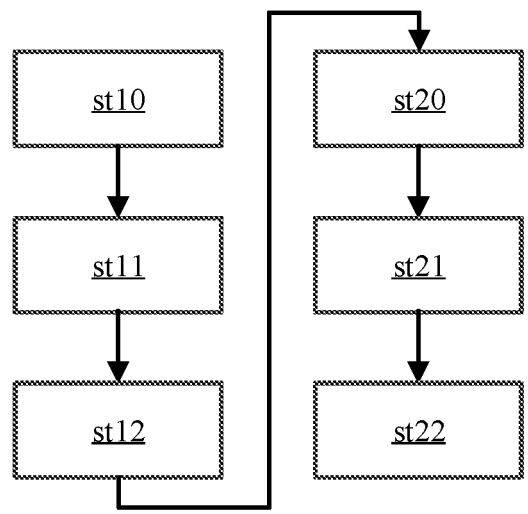

FIG. 2b shows a diagram of the steps of a first mode of operating the communication authentication device 200 according to the second embodiment of the invention. According to this first operating mode, the processor P is configured to:
- according to step st10, acquire a first message in a binary format via the first communication interface Int1;
- according to step st11, decode the first message in the binary format in accordance with a so-called "H standard", to obtain a first decoded message in a text format;
- according to step st12, transmit the first decoded message in the text format to the display screen;
- according to step st20, acquire a second message in the text format via the second input interface Int2;
- according to step st21, compare the second message in the text format with the first interpreted message in the text format;
- according to step st22, transmit a result of the comparison to the display screen E.

In the present document, "result of a comparison between two messages" is taken to mean an information revealing all of the differences between said messages. The comparison is typically made by choosing one of the two messages as reference, and by searching for all the differences with the other message, known as test message, relative to the reference message. A difference between the two messages may also be understood as a de-synchronisation between the two messages. A difference or de-synchronisation between two messages is notably:
- any addition in the test message compared to the reference message,
- and deletion in the test message compared to the reference message, any displacement in the test message compared to the reference message.

The first mode of operating the communication authentication device 200 according to the second embodiment of the invention, which makes it possible to compare two messages in the text format, corresponds to a semantic approach.

"Semantic approach" is taken to mean an approach according to which one is interested in the impact of a potential error or modification in the implementation of a message in a binary format, on the sense of said message once interpreted in a text format.

As an example, the following will now be described:
a first decoded message in the text format,
a second message in the text format acquired via the second input interface Int2, and
a result of the comparison of the second message in the text format with the first decoded message in the text format.

According to this example, each message comprises a geographic coordinates information, with a latitude and a longitude.

The first decoded message in the text format is for example the following:

| <m> | <coos> | | |
|---|---|---|---|
| | | <lat> 43.36 </lat> | |
| | | <long> 43.36 </long> | |
| | </coos> | | |
| </m> | | | |

The second message in the text format acquired via the second input interface Int2 is for example the following:

| <m> | <coos> | | |
|---|---|---|---|
| | | <lat> 17.2 </lat> | |
| | | <long> 43.36 </long> | |
| | </coos> | | |
| </m> | | | |

The result of the comparison of the second message in the text format with the first decoded message in the text format is then for example the following:

| <m> | <coos> | | |
|---|---|---|---|
| | | <lat> | <s1> 43.6 </s1> |
| | | | <s2> 17.2 </s2> |
| | | </lat> | |
| | | <long> 43.36 </long> | |
| | </coos> | | |
| </m> | | | |

A comparison message has thus been produced that may be used to obtain an intelligent display enabling a rapid visualisation of the differences.

Figure 2C:
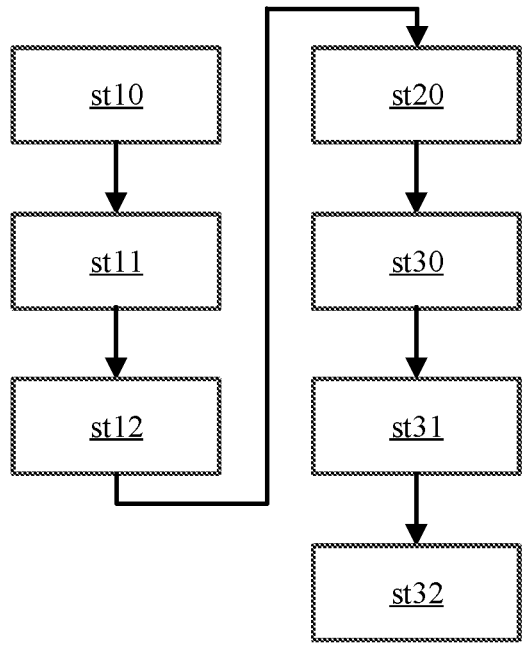

FIG. 2c shows a diagram of the steps of a second mode of operating the communication authentication device 200 according to the second embodiment of the invention. According to this second operating mode, the processor P is configured to:
  according to step st10, acquire a first message in a binary format via the first communication interface Int1;
  according to step st11, decode the first message in the binary format in accordance with a so-called "H standard", to obtain a first decoded message in a text format;
  according to step st12, transmit the first decoded message in the text format to the display screen;
  according to step st20, acquire a second message in the text format via the second input interface Int2;
  according to step st30, encode the second message in the text format according to the binary format to obtain a second message in the binary format;
  according to step st31, compare the first message in the binary format with the second message in the binary format;
  according to step st32, transmit a result of the comparison to the display screen E.

In the same way as described previously, "result of a comparison between a test message and reference message" is taken to mean an information revealing all of the differences between said messages, and notably:
  any addition in the test message compared to the reference message,
  any deletion in the test message compared to the reference message,
  any displacement in the test message compared to the reference message.

The second mode of operating the communication authentication device 200 according to the second embodiment of the invention, which makes it possible to compare two messages in the binary format, corresponds to a syntactic approach. "Syntactic approach" is taken to mean an approach according to which one is interested in any potential error or modification in the implementation of a message in a binary format, independently of the impact of such an error or modification on the sense of said message once interpreted in a text format.

Figure 2D:
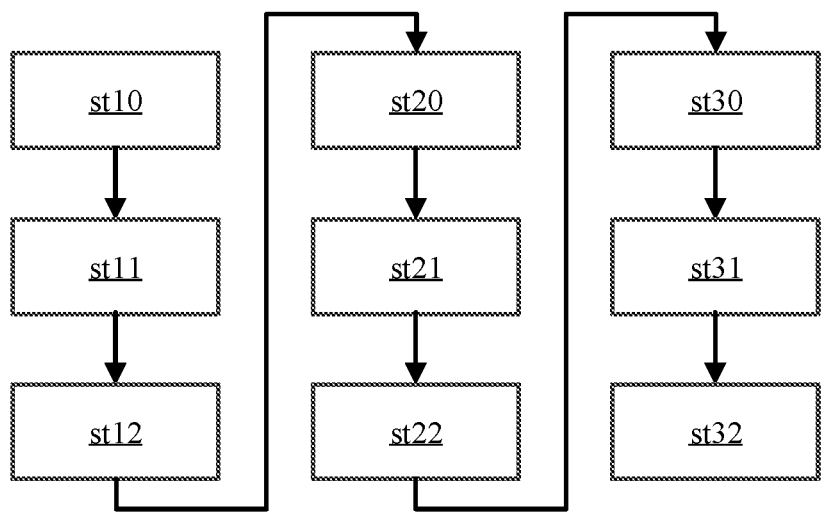

FIG. 2d shows a diagram of the steps of a third mode of operating the communication authentication device 200 according to the second embodiment of the invention. The third operating mode compiles the first and second operating modes described previously. Thus, according to this third operating mode, the processor P is configured to:
  according to step st10, acquire a first message in a binary format via the first communication interface Int1;
  according to step st11, decode the first message in the binary format in accordance with a so-called "H standard", to obtain a first decoded message in a text format;
  according to step st12, transmit the first decoded message in the text format to the display screen;
  according to step st20, acquire a second message in the text format via the second input interface Int1;
  according to step st21, compare the second message in the text format with the first interpreted message in the text format;
  according to step st22, transmit a result of the comparison to the display screen E;
  according to step st30, encode the second message in the text format according to the binary format to obtain a second message in the binary format;
  according to step st31, compare the first message in the binary format with the second message in the binary format;
  according to step st32, transmit a result of the comparison to the display screen E.

The third operating mode advantageously combines the semantic and syntactic approaches described previously.

The invention claimed is:

1. A communication authentication device, comprising:
a data storage system;
a first communication interface;

a second input interface different from the first communication interface; and a processor connected to the data storage system, the first communication interface, and the second input interface, the processor being configured to:

receive a first message in a binary format via the first communication interface;

decode the first message in the binary format in accordance with a message formatting standard, to obtain a first decoded message in a text format;

receive a second message in the text format via the second input interface, the second message being transmitted to the second input interface in text format;

compare textual content of the second message with textual content of the first decoded message, wherein the comparison indicates one or more of addition, deletion, and displacement of the textual content of the second message with respect to the textual content of the first decoded message; and authenticate a communication based on a result of the comparison, wherein the first message is transmitted to the first communication interface in binary format such that the first message and the second message are transmitted to, respectively, the first communication interface and the second input interface in different formats.

2. The communication authentication device according to claim 1, wherein a size of a shortest message of the message formatting standard is 48 bits.

3. The communication authentication device according to claim 1, further comprising a display screen, wherein the processor is further configured to transmit the first decoded message in the text format to the display screen.

4. The communication authentication device according to claim 1, wherein the first message is based on a first file extension, and wherein the second message is based on a second file extension different from the first file extension.

5. The communication authentication device according to claim 1, wherein the second message is transmitted to the second input interface in text format such that the second message is directly readable with a text editor.

6. The communication authentication device according to claim 1, wherein the second message received via the second input interface is a non-coded message.

7. A communication authentication device, comprising:
a data storage system;
a first communication interface;
a second input interface different from the first communication interface;
a display screen; and
a processor connected to the data storage system, the first communication interface, and the second input interface, the processor being configured to:

receive a first message in a binary format via the first communication interface;

receive a second message in a text format via the second input interface, the second message being transmitted to the second input interface in text format;

encode the second message in the text format according to the binary format and to a message formatting standard to obtain a second encoded message in the binary format;

compare binary content of the first message with binary content of the second encoded message;

transmit, to the display screen, one or more of addition, deletion, and displacement of bits of the second encoded message with respect to the binary content of the first message; and authenticate a communication based on a result of the comparison, wherein the first message is transmitted to the first communication interface in binary format such that the first message and the second message are transmitted to, respectively, the first communication interface and the second input interface in different formats.

8. A communication authentication device, comprising:
a data storage system;
a first communication interface;
a second input interface;
and
a processor connected to the data storage system, first communication interface, and second input interface, the processor being configured to:

receive a first message in a binary format via the first communication interface;

decode the first message in the binary format in accordance with a message formatting standard, to obtain a first decoded message in a text format;

receive a second message in the text format via the second input interface, the second message being transmitted to the second input interface in text format;

compare the second message in the text format with the first decoded message in the text format to generate a first result of the comparison;

encode the second message in the text format according to the binary format to obtain a second message in the binary format;

compare the first message in the binary format with the second message in the binary format to generate a second result of the comparison; and authenticate a communication based on one or more of the first result and the second result, wherein each of the comparisons indicates one or more of additions, deletions, and displacements of content in the respective messages, and wherein the first message is transmitted to the first communication interface in binary format such that the first message and the second message are transmitted to, respectively, the first communication interface and the second input interface in different formats.

\* \* \* \* \*